United States Patent [19]
McGann

[11] 3,912,460
[45] Oct. 14, 1975

[54] METHOD AND ARTICLE FOR DISTRIBUTING AIR IN A REGENERATOR

[75] Inventor: Rodney McGann, Northridge, Calif.

[73] Assignee: Texaco Development Corporation, New York, N.Y.

[22] Filed: Nov. 19, 1973

[21] Appl. No.: 417,166

[52] U.S. Cl. ............ 23/288 B; 29/157 R; 29/157 C; 208/113; 239/559; 252/417
[51] Int. Cl.² ...................... B21K 21/08; B01J 8/24
[58] Field of Search ................... 23/288 B; 208/113; 252/417; 239/559, 567, 565, 558; 29/157 R, 157 C

[56] References Cited
UNITED STATES PATENTS

| | | | |
|---|---|---|---|
| 1,955,622 | 4/1934 | Dayton | 239/565 X |
| 2,816,011 | 12/1957 | Trainer et al. | 23/288 |
| 3,785,779 | 1/1974 | Li et al. | 239/558 X |

*Primary Examiner*—James H. Tayman, Jr.
*Attorney, Agent, or Firm*—Thomas H. Whaley; Carl G. Ries; Theron H. Nichols

[57] ABSTRACT

A method of assembling an air distribution system for distribution of an equal proportion of a combustion supporting gas as air to catalyst in a regenerator for providing regeneration of catalyst material in a fluid catalytic cracking process is disclosed. An exemplary air distribution system comprises a horizontal circular distributing ring centered in the catalyst in the regenerator and comprising two tapered semicircular tubes which are interconnected at their small ends and a splitter tube joint interconnecting a pressurized air supply source with the two larger ends of the tapered semicircular tubes. Also a closed end cylindrical plenum is mounted around and over the splitter tube joint with an air inlet solely from the pressurized air inlet end of the splitter tube joint. Exit orifices eject the pressurized air downwardly from both sides of the semicircular tubes and the plenum preferably at an angle of 45° below the horizon to provide improved even air distribution and an improved fluidized bed. Modifications utilize two and three coplanar rings spaced in the regenerator to provide an equal proportion of air-to-catalyst throughout the regenerator.

13 Claims, 9 Drawing Figures

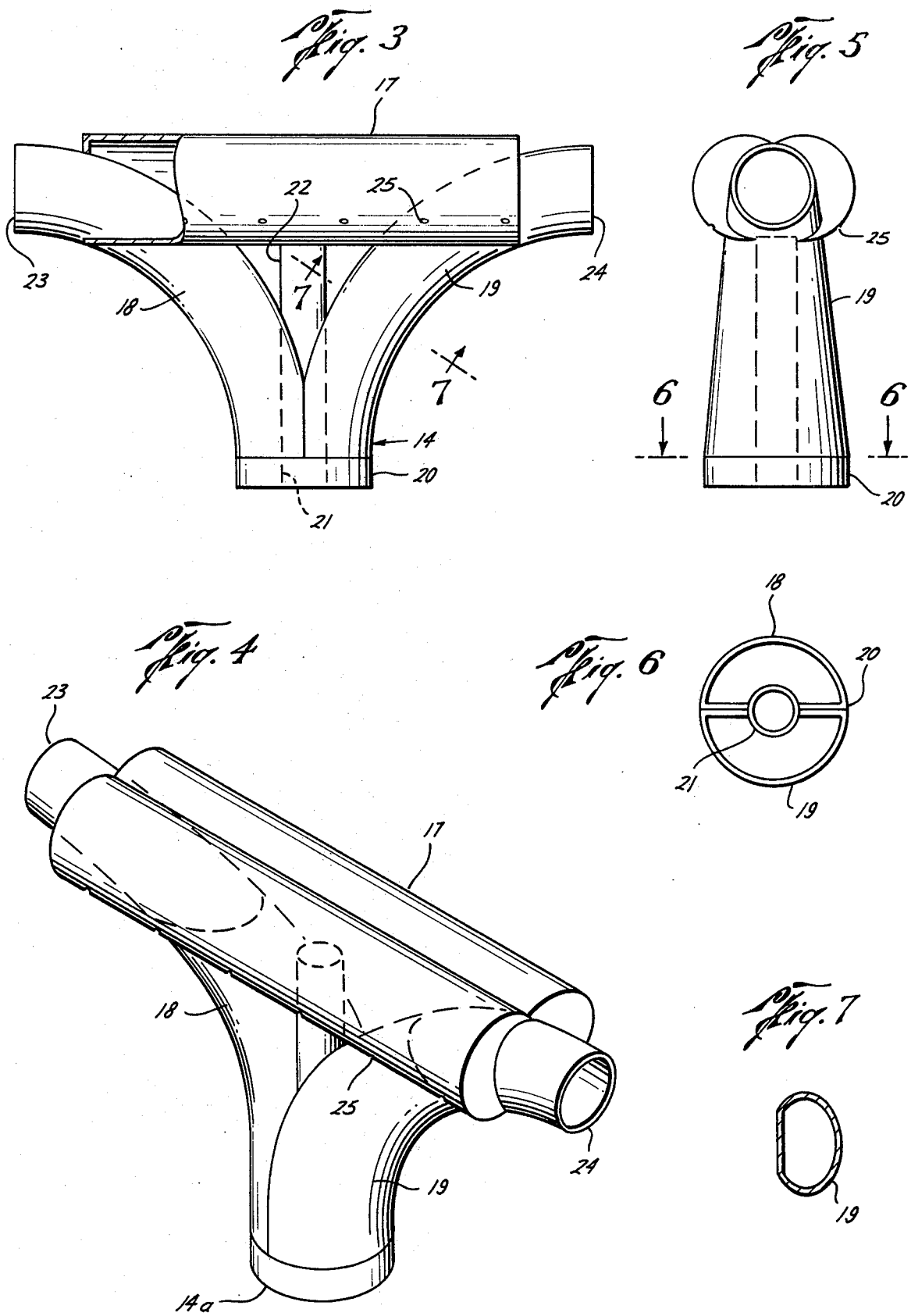

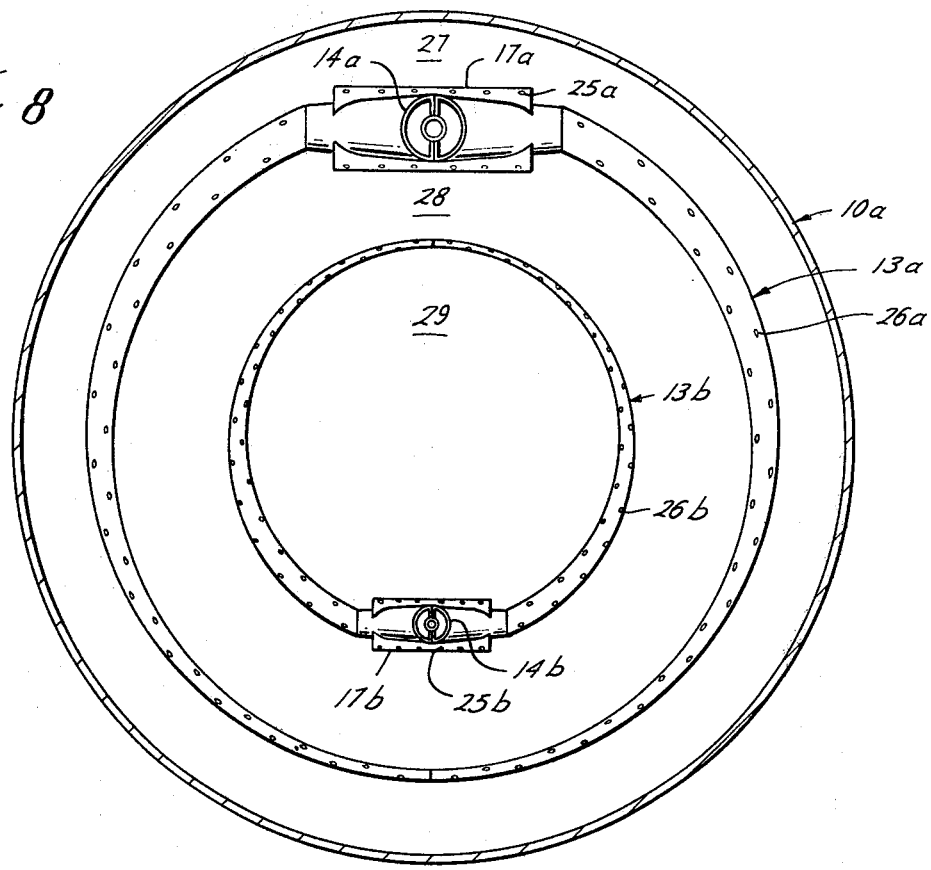
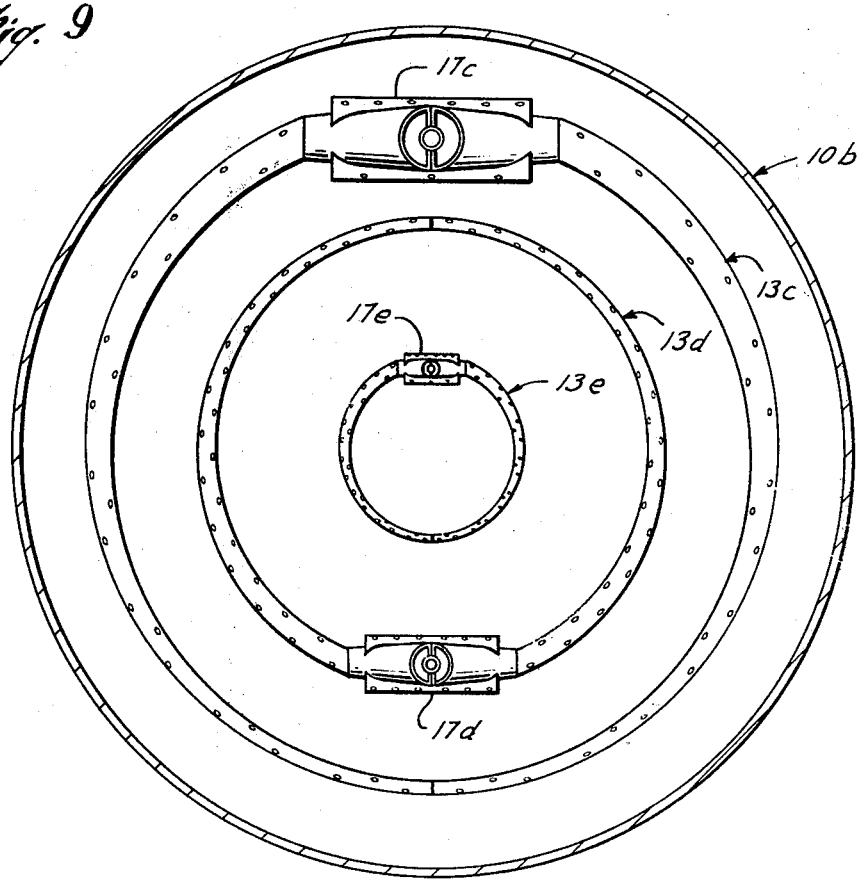

METHOD AND ARTICLE FOR DISTRIBUTING AIR IN A REGENERATOR

BACKGROUND OF THE INVENTION

The regeneration apparatus in general, and the process of this invention, are used in a fluid catalytic cracking system as described and claimed in U.S. Pat. Nos. 3,394,096 and 3,433,733 by the Assignee of the instant invention. The disclosed invention is an improved air distribution system over the two-element circular and serpentine air tubes disclosed in Assignee's patent application Ser. No. 197,762, filed Nov. 11, 1971, now U.S. Pat. No. 3,806,324 issued Apr. 23, 1974.

In fluidized solids reaction vessels, the solids to be treated are normally introduced into one section of the vessel and withdrawn from another section. In the interim the solids are reacted with a gaseous medium that also serves as a fluidization vehicle. The fluidization vehicle or material is normally introduced into the lower section of the regeneration vessel or regenerator through a suitable type of distributor and withdrawn from the upper portion, usually through means adapted to remove gas entrained solid material.

The degree of reaction that takes place in the regeneration chamber of the regenerator between the vapors and solids is normally a function of such variables as temperature, pressure and reaction time. It is also important, therefore, that the inlet solids be maintained in the reaction zone sufficiently long to permit reaction to reach a desired degree of completion.

It is further desired that to afford a more complete reaction of the coke or carbon coating on the catalyst particles, the latter be circulated through the regeneration chamber within a gas stream wherein gas flow discontinuities are minimized. The latter when present in a regenerating chamber causes non-uniform treating of the particles, and an overall inefficient process.

In accordance with the invention then, a combustion supporting gas, usually air, is introduced to the regenerator in a manner to assure adequate and efficient treating of the fluidized catalyst. This is achieved through the expedient of a unique gas or air distribution system for providing an equal proportion of air-to-catalyst throughout the regenerator comprising two arcuate tapered semicircular tubes joined at their small ends and a splitter tube joint interconnecting a pressurized air supply source with the two larger ends of the tapered semicircular tubes, a closed end cylindrical plenum over the splitter tube joint, and exit orifices which eject the pressurized air downwardly at 45° angles from both sides of the semicircular tubes and the plenum, all in the regeneration chamber. The tubing and plenum cause a constant, relatively evenly distributed and continuous upward gaseous flow through the chamber toward the discharge section thereof. The result achieves the desired uniformity of temperature, pressure, and density within the catalyst bed during the regeneration stage of the process.

The invention therefore relates to an improvement in the regeneration of catalyst used in the fluid catalytic cracking process described in U.S. Pat. No. 3,433,733. Briefly, in said claimed process, a hydrocarbon is contacted with a fluidized or particulated solid catalyst within a reaction zone whereby to effect conversion of at least a portion of the hydrocarbon to desired conversion products. There further results the concomitant deposition of coke on the catalyst outer surface such as to decrease the effectiveness thereof. The catalyst, with the outer layer of coke, is therefore continuously removed from the reaction zone and then stripped. The stripped catalyst is then passed as a dense phase into the dense phase portion of the regeneration zone. Within the latter, the particulated catalyst is contacted with an oxygen-carrying gas to effect combustion of at least a portion of the coke coating and thereby achieving regeneration of the catalyst.

Regenerated catalyst material is thereafter continuously withdrawn from the regeneration zone and again introduced to the reaction zone. To prompt an efficient regeneration step, an even distribution of regeneration air is introduced into the lower portion of the dense phase bed of the regeneration zone, or different amounts of air are provided to various portions to provide an equal proportion of air-to-catalyst throughout the regenerator.

In accordance with the invention, the upward flow of combustion supporting material through the regeneration zone, which in this instance will be referred to as air, is achieved by so designing the air carrying manifold system to assure the desired air flow in spite of the splitter tube joint between the air supply source and both halves of the distribution ring disposed within the regeneration chamber to provide an equal proportion of air to the catalyst throughout the regenerator.

OBJECTS OF THE INVENTION

Accordingly, the primary object of this invention is to provide a method of assembling an air distribution system for distributing an equal proportion of air-to-catalyst throughout a regenerator in a fluid catalytic cracking process.

Another primary object of this invention is to provide an air distribution system that may be made by the disclosed method.

A further object of this invention is to provide means for achieving a more uniform and efficient regeneration of a fluid catalyst by distribution of an equal proportion of a combustion supporting gas-to-catalyst throughout the regeneration zone.

A further object of this invention is to provide an air distribution system that will provide an evenly distributed and continuous upward gaseous flow through the regenerator to provide an equal proportion of gas-to-catalyst to avoid flow discontinuities and disturbances in the air stream and fluidized bed.

A still further object of this invention is to provide a unique air distribution system within a regenerator for achieving the desired uniform regeneration step.

A further object of this invention is to provide an air distribution system in a fluid catalytic cracking unit that is easy to operate, is of simple configuration, is economical to build and assemble, and is of greater efficiency for avoiding discontinuities and disturbances in the air stream.

Other objects and various advantages of the disclosed air distribution system will be apparent from the following detailed description, together with the accompanying drawings, submitted for purposes of illustration only and not intended to define the scope of the invention, reference being had for that purpose to the subjoined claims.

BRIEF DESCRIPTION OF THE DRAWINGS

The drawings diagrammatically illustrate by way of example, not by way of limitation, one form or mechanism for carrying out the method of the invention wherein like reference numerals have been employed to indicate similar parts in the several views in which:

FIG. 3 is a schematic enlarged elevation of the new combination splitter bend tube joint and plenum of the disclosed air distribution ring;

FIG. 4 is a schematic perspective view of the splitter tube joint of FIG. 3;

FIG. 5 is a schematic end view of the embodiment of FIG.. 3;

FIG. 6 is a schematic sectional view taken at 6—6 on FIG. 5;

FIG. 7 is a schematic sectional view taken at 7—7 on FIG. 3;

FIG. 8 is a modification of FIG. 2; and

FIG. 9 is another modification of FIG. 2.

DESCRIPTION OF THE INVENTION

Figure 1:
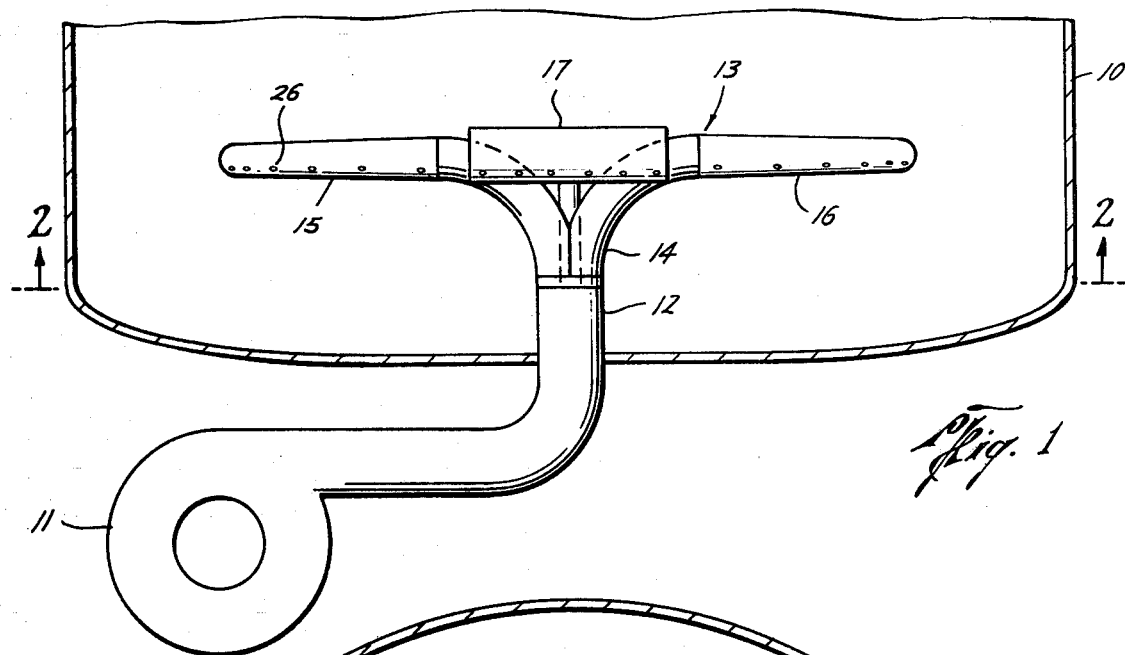
FIG. 1 is a schematic elevation with parts cut away of the complete regenerator air distribution system.

The invention disclosed herein, the scope of which being defined in the appended claims, is not limited in its application to the details of construction and arrangement of parts shown and described for carrying out the disclosed method, since the invention is capable of other embodiments for carrying out other methods and of being practiced or carried out in various other ways. Also, it is to be understood that the praseology or terminology employed herein is for the purpose of description and not of limitation. Further, many more modifications and variations of the invention as hereinbefore set forth will occur to those skilled in the art. Therefore, all such modifications and variations which are within the spirit and scope of the invention herein are included and only such limitations should be imposed as are indicated in the appended claims.

DESCRIPTION OF THE METHOD

This invention comprises a new method for assembling an air distribution system for the distribution of air in a regenerator in a fluid catalytic cracking unit and a mechanism for practicing the method.

In a fluid catalytic cracking process, a new method for assembling an air distribution system for the distribution of air to provide an equal proportion of air-to-catalyst in a regenerator comprises the steps of, 1. forming two tapered arcuate semicircular tubes,
2. connecting the small ends of the two semicircular tapered tubes to form substantially a circular ring horizontally in the regenerator,
3. connecting a splitter tube joint means between the large ends of the semicircular tapered tubes and a pressurized air supply means, and
4. forming a closed end cylinder between the large ends of the semicircular tubes, and
5. supplying pressurized air to the circular ring and to the cylinder for providing improved air distribution and fluidized bed in the regenerator.

In greater detail the new method for assembling an air distribution system for the distribution of air in a regenerator in a fluid catalytic cracking process comprises the method above plus the following step, 4a. forming orifices in both sides of the bottom of the circular ring and the cylinder for ejecting air downwardly at a 45° angle below the horizon on both sides of the ring and cylinder for ensuring even air distribution throughout the regenerator.

Another method for assembling an air distribution system for the distribution of air in a regenerator for providing an equal proportion of air-to-catalyst throughout the regenerator comprises the above five-step method plus the following step inserted between steps (4) and (5):

(4a) forming the number of orifices on each side of the circular ring and the cylinder in proportion to the amount of catalyst on each side of the ring and cylinder to provide an equal proportion of air-to-catalyst throughout the regenerator.

A further method for assembling an air distribution system for distributing air in a regenerator comprises the above first five-step method plus the following step, 6. repeating the above five method steps a second time for forming an air distributor ring inside and concentric with the first formed air distribution ring for added efficiency of completion of reaction of the coke or carbon coating on the catalyst particles.

A still further method, when so required, for assembling an air distribution system distributing air in a regenerator comprises the above first five-step method plus the following step, 6. repeating the above five method steps a plurality of times, each time forming a smaller concentric ring inside the last ring for forming air distribution rings for added efficiency of completion of reaction of the coke or carbon coating on the catalyst particles.

Obviously the above methods may be used to assemble other systems than the three disclosed hereinafter, and the air distribution system disclosed may be assembled by other methods than those set forth above, as by hand.

REGENERATOR AIR DISTRIBUTION SYSTEM

The drawings illustrate three embodiments that may be made by the above disclosed methods or they may be made by materially different methods.

FIRST MODIFICATION

Figure 2:
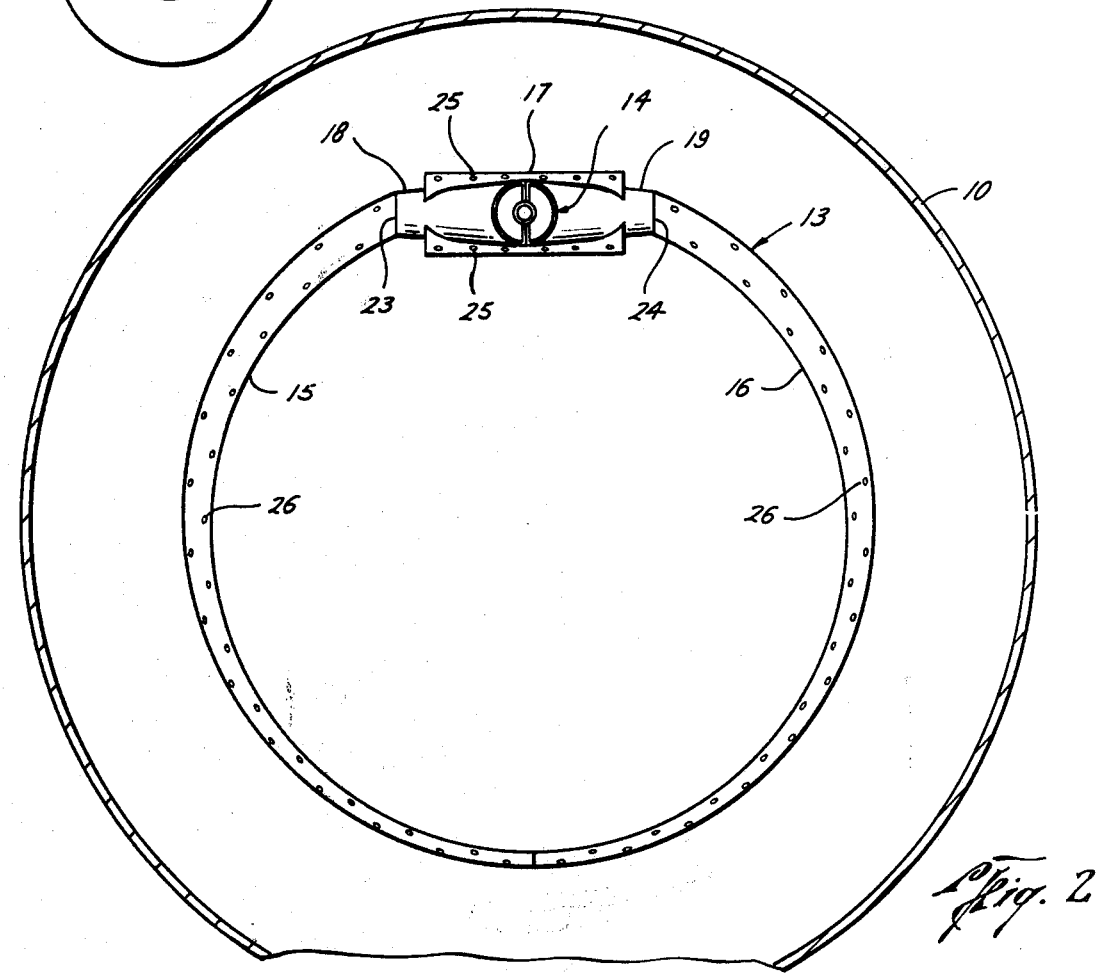
FIG. 2 is a schematic sectional view at 2—2 on FIG. 1.

FIG. 1, a front view with parts in section and FIG. 2, a section at 2—2 on FIG. 1, disclose the complete system, schematically, for distributing air in the regenerator 10. The air distribution system comprises a suitable conventional blower 11, FIG. 1, only for supplying a great amount of pressurized air to an air header 12 which protrudes up through the bottom of the regenerator for supplying a distributor ring 13, FIGS. 1 and 2. A typical output for the pressurized air supplied to the distribution ring is air at a pressure of 27 psig (pounds per square inch, gauge) and at a temperature of 350° Fahrenheit.

The distribution ring 13, FIGS. 1 and 2, is the main feature of the instant distribution system. It comprises a splitter tube joint 14 for receiving pressurized air from the air header 12, FIG. 1, at one side of the regenerator for distributing the air equally to the two arcuate, semicircular, tapered tubes 15 and 16, the tapered or small ends of the tapered tubes being fixedly connected together at the other side of the regenerator to form a horizontal ring in the lower portion of the regenerator.

A double lobe, closed end plenum 17, FIGS. 1 and 2, extends horizontally substantially from one arcuate semicircular tube to the other and circumscribes most of the upper portion of the splitter tube joint for ensuring even air distribution throughout the regenerator as explained in greater detail below.

While FIG. 3 is a schematic enlarged plan view of the combination splitter bend tube joint 14 and plenum 17, FIG. 3 illustrates the combination of FIG. 3 in perspective for receiving pressurized air from air header 12, for splitting the air into two equal parts, and for supplying pressurized air to the two halves of the ring.

Splitter bend tube joint 14, FIGS. 3 and 4 comprises two arcuate, 90° elbows 18, 19, each having a substantially constant cross-sectional area for the full length thereof. Also, each elbow extends from a large circular air inlet 20, FIG. 6, having an area equal to the sum of the cross-sectional areas of the two elbows 18, 19, and the circular inlet area 21 of a duct 22, FIG. 3, extending to the plenum 17, to the outer ends of the elbows. Each elbow 18 and 19 curves 90° from large air inlet 20 in opposite directions to 180° from each other. An air outlet 23, FIG. 2, on elbow 18 of the splitter bend tube joint connects to the large end of semicircular tapered tube 15, and air outlet 24 on elbow 19 of the splitter tube joint connects to the large end of semicircular tapered tube 16 for supplying pressurized air thereto.

The plenum 17, FIGS. 3 and 4, comprises two parallel cylinders joined to each other on one side and extends between the two outlet ends 23 and 24 of the splitter tube joint. While the ends of the double cylinder plenum 17 are sealed, the plenum encloses a portion of the arcuate elbows 18, 19. Air inlet 21, FIGS. 3, 6, of the air duct 22, FIG. 3, is the sole inlet for receiving ram or compressed air for the plenum 17 from the air header 12, FIG. 1, for preventing ingestion of catalyst at the entrance to the ring.

Holes or orifices 25, FIGS. 2, 3, and 4, are formed preferably in the lower sides of the plenum 17 to eject compressed air outwardly and downwardly from the plenum substantially 45° below the horizon on both sides of the plenum. While an orifice setting of 45° is the preferable angle, if so desired and if so required by the design of the regenerator, other angles may be utilized to ensure an equal proportion of air-to-catalyst throughout the regenerator.

Holes or orifices 26, FIGS. 1 and 2, similar to holes 25 described above are formed in the lower sides of the arcuate tapered semicircular tubes 15 and 16 for ejecting compressed air outwardly and downwardly from the tapered tubes substantially 45° below the horizon on both sides of the tubes. The hole pattern is determined to provide the desired flow distribution which in this case provides an equal proportion of air-to-catalyst throughout the regenerator. The number of holes is equal on both sides of the ring if equal volumes of fluid exist on each side of the ring, as illustrated in FIGS. 1 and 2. However, if the greater volume is contained in the vertical annulus of fluid in the regenerator formed between the walls of the regenerator and a vertical cylinder through the ring as compared to the volume internally of the cylinder through the ring, then a proportionate greater number of holes are formed in the row on the outside of the ring and plenum than in the inside row of holes to ensure an equal proportion of air-to-catalyst throughout the regenerator.

The air discharge local velocity, is normally and preferably uniform from all holes.

FIG. 5 is a schematic side view of FIG. 3.
FIG. 6 is a schematic section at 6—6 on FIG. 5.
FIG. 7 is a schematic section at 7—7 on FIG. 3, illustrating the constant cross-sectional area of elbow 19 from end-to-end. Elbow 18 is similar.

The equal sized orifices 26 vary in number in the bottom of the tapered tubes inversely with the amount of taper and pressure in the semicircular, perforated, tapered tubes 15, 16 to ensure an even distribution of small air bubbles throughout the fluidized bed of the regenerator for a regenerator having a constant density of catalyst throughout.

Further, the even distribution of orifices in the plenum bottom assures an even constant distribution of air and an equal proportion of air-to-catalyst over the area of thhe splitter tube joint.

SECOND MODIFICATION

FIG. 8, a bottom sectional view, illustrates the preferred regenerator 10a similar to the regenerator 10 of the first modification of FIG. 2, but having a modified air distribution system comprising two rings 13a and 13b for carrying out the above methods.

Each of rings 13a and 13b, FIG. 8, is similar to ring 13, FIG. 2. While the two rings 13a and 13b are normally coplanar, the principal difference is that inner ring 13b is smaller in diameter and circumferential length than ring 13a. Rings 13a and 13b have equal size air ejecting orifices or holes 25a, 26a, and 25b, 26b, respectively, on both sides of the rings for ejecting air at a constant velocity into the bottoms of three vertical portions 27, 28, and 29 formed between vertical chambers through each ring and comprising the total volume of the fluid in the regenerator 10a. For a constant density of catalyst throughout the regenerator, the number of orifices ejecting air into each vertical chamber is proportional to the volume of each of the three chambers for providing an equal air-to-catalyst ratio throughout the regenerator.

Both rings 13a and 13b have their respective splitter bend tube joints 14a, 14b, and plenums 17a, 17b, from their air header (not shown) for receiving air from the air blower 11, FIG. 1, all of the rings, plenums, and splitter bend tube joints of FIG. 8 being similar to the corresponding elements of FIGS. 1 and 2.

THIRD MODIFICATION

FIG. 9, a bottom sectional view of another modification of the regenerator 10 of FIG. 2, illustrates a modified air distribution system comprising three concentric, substantially coplanar, distributor rings 13c, 13d, and 13e mounted in the regenerator 10b as required in this particular design.

As an example of hole pattern variation, with the orifices in the middle ring 13d being evenly distributed therethrough, it may be noted that rings 13c and 13e with their respective plenums 17c and 17e all have a larger number of air ejecting orifices on the outside row of each relative to the inside row of each in proportion to the variation in volume of the four vertical portions 31, 32, 33, and 34 of the total volume of the fluid in the regenerator formed by three vertical cylinders through the three rings for maintaining the air-to-catalyst ratio constant throughout the regenerator 10b.

The distributor rings 13c–13e with their respective plenums 17c–17e and air ejecting orifices of the FIG. 9 modification are similar to the corresponding elements of the modification of FIGS. 1 and 2 described above.

Thus with the rings 13–13e of FIGS. 2, 8, and 9 positioned in the regenerators as veiwed in FIGS. 2, 8, and 9, respectively, good and even or equal air-to-catalyst ratio results from the new air distribution systems, improved fluidization of the bed results due to the more and proportionally spaced smaller bubbles, greater integrity is maintained throughout the systems, pressure drop is minimized throughout the rings, the amount of pressurized air required is substantially reduced providing reduced investments and maintenance, impingement on structural portions of the regenerators is avoided, and catalyst attrition is attenuated in carrying out the methods of the invention.

Obviously other methods may be utilized for producing other air distribution systems and distribution rings for such systems.

Accordingly, it will be seen that a few methods and a few air distribution systems are disclosed that will operate in a manner which meets each of the objects set forth hereinbefore.

While only a few mechanisms have been disclosed, it will be evident that various other modifications are possible in the arrangement and construction of the disclosed air distribution systems without departing from the scope of the invention and it is accordingly desired to comprehend within the purview of this invention such modifications as may be considered to fall within the scope of the appended claims.

I claim:

1. A method of assembling an air distribution system for the distribution of air to provide an equal proportion of air-to-catalyst fluidized bed in a regenerator in a fluid catalytic cracking process comprising the steps of,
   a. forming two tapered arcuate semicircular tubes, each tube having large and small ends relative to the tube diameter at the mid-point between the ends,
   b. connecting the small ends of the two semi-circular tubes to form substantially a circular ring horizontally in the regenerator,
   c. connecting a splitter tube joint means between the large ends of the semi-circular tubes and a pressurized air supply means,
   d. forming a plenum vertically over and around a portion of the splitter tube joint means,
   e. forming orifices in both the circular ring and the plenum for ejecting air, and
   f. connecting a pressurized air supply source to the circular ring and to the plenum for ejecting air from the orifices therein for providing improved air distribution.

2. A method as recited in claim 1 wherein the last step comprises,
   a. forming the orifices in both sides of the bottom of the circular ring and the plenum for ejecting air downwardly at a 45 degree angle below the horizon on both sides of the ring and plenum for ensuring improved air distribution throughout the regenerator.

3. A method as recited in claim 1 with the addition of the following steps between steps (e) and (f) of claim 1,
   a. forming the orifices on both inside and outside of the circular ring and the plenum for ejecting air into the catalyst on both sides of the ring, and
   b. forming the number of orifices on each side of the circular ring and the plenum in proportion to the amount of catalyst on each side of the ring for insuring an equal proportion of air-to-catalyst throughout the regenerator.

4. A method as recited in claim 3 with the additional steps of,
   a. repeating the first seven steps of the above method for forming a second air distribution ring inside and concentric with the first formed air distribution ring for added efficiency of completion of reaction of a carbon coating on the catalyst.

5. A method as recited in claim 3 with the additional steps of,
   a. repeating the first seven method steps a plurality of times, forming each time a smaller concentric ring inside of the last ring for added efficiency of completion of reaction of a carbon coating on the catalyst.

6. An air distribution system for a regenerator having a fluidized bed in a fluid catalytic cracking unit comprising,
   a. regenerator means having a pressurized air supply means,
   b. horizontal perforated circular tube means centered in said regenerator means,
   c. splitter tube joint means for supplying air from said pressurized air supply means to said perforated circular tube means, and
   d. said splitter tube joint means having a closed ended perforated cylinderical plenum means positioned vertically over and around a portion of said splitter tube joint means, said plenum means having air duct means for receiving air from said pressurized air supply means for providing an improved fluidized bed in the regenerator.

7. An air distribution system as recited in claim 6 wherein,
   a. said circular perforated tube means has orifice means for ejecting the air downwardly from both sides of the tube means at a 45° angle below the horizon for ensuring an equal proportion of air-to-catalyst throughout the regenerator.

8. An air distribution system as recited in claim 6 wherein,
   a. said splitter tube joint means comprises two arcuate air ducts projecting oppositely from a common large air inlet and ending with air exits pointed in opposite directions,
   b. each of said air exits is connected to an opposite semicircular portion of the perforated circular tube means for supplying air to its tube portion to a location in the circular tube means diametrically opposite said splitter tube means, and
   c. each of said semicircular tube portions is tapered from the splitter tube joint means to said opposite location for providing an equal proportion of air-to-catalyst throughout the regenerator.

9. An air distribution system as recited in claim 6 wherein, a. said splitter tube joint means comprises two arcuate air ducts projecting oppositely from a common large air inlet and ending with air exits pointed in opposite directions, b. each arcuate air duct curves from its air inlet through an arc of 90° in an opposite direction to the other air duct to form its air exit for connecting in the circular tube means, and c. each arcuate duct maintaining a constant cross-sectional area from its inlet to its exit.

10. An air distribution system as recited in claim 6 wherein, a. said splitter tube joint means comprises two arcuate air ducts projecting oppositely from a common large air inlet and ending with air exits pointed in opposite directions, b. said plenum means comprises an elongated closed end perforated cylinder mounted on top of and around a portion of said splitter tube joint means between said two oppositely projecting arcuate air ducts and an air inlet for said plenum, and c. said air inlet comprises a tube extending from said large air inlet to the center of said perforated cylinder.

11. An air distribution system for a regenerator having a fluidized bed in a fluid catalytic cracking unit comprising, a. regenerator means having a pressurized air supply means, b. horizontal perforated circular tube means centered in said regenerator means, c. splitter tube joint means for supplying air from said pressurized air supply means to said perforated circular tube means, d. said splitter tube joint means having a closed ended perforated cylindrical plenum means thereover for said perforated circular tube means for receiving air from said pressurized air supply means for providing an improved fluidized bed in the regenerator, e. said splitter tube joint means comprises two arcuate air ducts projecting oppositely from a common large air inlet and ending with air exits pointed in opposite directions, f. said plenum means comprises an elongated closed ended perforated cylinder mounted on top of said splitter tube joint means between two oppositely projecting arcuate air ducts and an air inlet for said plenum, g. said air inlet comprises a tube extending from said large air inlet to the center of said perforated cylinder, h. said perforated cylindrical plenum means has orifice means for ejecting the air downwardly from both sides of the cylindrical plenum means at a 45° angle below the horizon for ensuring an equal proportion of air-to-catalyst throughout the regenerator.

12. An air distribution system for a regenerator having a fluidized bed in a fluid catalytic cracking process comprising, a. a regenerator having an opening in the lower portion thereof, b. an air supply conduit having an upper end protruding upwardly through said regenerator opening from a pressurized air supply means, c. a horizontal circular tube perforated on the bottom thereof and substantially centered in said regenerator, d. a splitter tube joint having a large air inlet connecting said air supply conduit upper end to said circular perforated tube, e. said splitter tube joint having a perforated plenum mounted vertically over and around a portion of said large air inlet, and f. a plenum air duct connected between said air supply conduit upper end and said plenum for improved distribution of air for forming an improved fluidized bed in the regenerator.

13. An air distribution ring for use in a regenerator in a fluid catalytic cracking unit comprising, a. two substantially semicircular tapered tubes, each tube having a large end and a small end, b. said small ends of the tubes being joined together with the two semicircular tubes being coplanar and with the larger ends facing each other, c. a splitter tube joint interconnecting said two tube larger ends for supplying compressed air thereto, d. said splitter tube joint comprises two arcuate 90° air ducts projecting oppositely from a common large air supply outlet and ending with air exits pointed in 180° opposite directions, e. each of said splitter tube joint air exits is connected to one of said semicircular tapered tube large ends for supplying air to the semicircular tapered tubes, f. an elongated double lobe closed end cylindrical plenum mounted to the top of said two arcuate air ducts, and g. both of said semicircular tapered tubes and said elongated closed end cylindrical plenum has orifices formed in the lower portion of both sides of the bottom of said tubes and plenum for ejecting air at a 45° angle below the horizontal on both sides for ensuring an equal proportion of air-to-catalyst throughout the regenerator.

* * * * *